United States Patent
Karmarkar et al.

(10) Patent No.: US 12,294,512 B2
(45) Date of Patent: *May 6, 2025

(54) DIRECTED BROADCAST IN NETWORK FABRIC

(71) Applicant: CISCO TECHNOLOGY, INC., San Jose, CA (US)

(72) Inventors: Kedar Sudhir Karmarkar, San Jose, CA (US); Shyamsundar N. Maniyar, San Jose, CA (US); Sanjay Kumar Hooda, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

This patent is subject to a terminal disclaimer.

(21) Appl. No.: 17/672,278

(22) Filed: Feb. 15, 2022

(65) Prior Publication Data

US 2022/0173999 A1    Jun. 2, 2022

Related U.S. Application Data

(63) Continuation-in-part of application No. 16/897,110, filed on Jun. 9, 2020, now Pat. No. 11,258,621.

(51) Int. Cl.
*H04L 45/16* (2022.01)
*H04L 45/74* (2022.01)

(52) U.S. Cl.
CPC ............ *H04L 45/16* (2013.01); *H04L 45/74* (2013.01)

(58) Field of Classification Search
CPC ..... H04L 45/16; H04L 45/74; H04L 61/5084; H04L 61/103; H04L 12/4633
See application file for complete search history.

(56) References Cited

U.S. PATENT DOCUMENTS

| 10,581,793 B1 | 3/2020 | Semwal |
| 10,716,045 B2 | 7/2020 | Allan |

(Continued)

FOREIGN PATENT DOCUMENTS

| CN | 102377633 A | 3/2012 |
| EP | 1950918 A1 | 7/2008 |

OTHER PUBLICATIONS

Chinese Office Action mailed Mar. 13, 2024 for Chinese Application No. 202180034460.4, a foreign counterpart to U.S. Pat. No. 11,258,621, 16 pages.

(Continued)

*Primary Examiner* — Azizul Choudhury
(74) *Attorney, Agent, or Firm* — Lee & Hayes, P.C.

(57) ABSTRACT

This technology enables directed broadcasts in network fabrics. A control plane node is configured to resolve directed broadcast addresses by mapping the directed broadcast address to a subnet address. A fabric border node receives a directed broadcast, extracts a destination address, and transmits a request to the control plane node to resolve the destination address. The control plane node retrieves the stored mapping and generates a map reply with a multicast destination. The fabric border node encapsulates and forwards the directed broadcast to fabric edge nodes, which decapsulate the directed broadcast and deliver a data set from the directed broadcast to appropriate end point devices. Each fabric edge node may be enabled to determine if the fabric edge node may be connected to a silent host and, based on that determination, request the fabric border node to be added to the multicast destination to receive the directed broadcast.

20 Claims, 8 Drawing Sheets

(56) References Cited

U.S. PATENT DOCUMENTS

| | | | | |
|---|---|---|---|---|
| 2008/0279186 | A1* | 11/2008 | Winter | H04L 69/08 370/392 |
| 2010/0135294 | A1* | 6/2010 | Asati | H04L 12/18 370/390 |
| 2013/0315246 | A1 | 11/2013 | Zhang | |
| 2014/0269729 | A1 | 9/2014 | Luo | |
| 2015/0030024 | A1 | 1/2015 | Venkataswami | |
| 2015/0195137 | A1* | 7/2015 | Kashyap | H04L 41/0893 370/254 |
| 2016/0036773 | A1* | 2/2016 | Luo | H04L 12/4633 370/392 |
| 2019/0334868 | A1* | 10/2019 | Tewari | G06F 9/45558 |

OTHER PUBLICATIONS

Maltabas S., et al., "An IDDQ Bist Approach To Characterize Phase-Locked Loop Parameters," 2013 IEEE 31st VLSI Test Symposium (VTS), Apr. 29, 2013, pp. 1-6.

"Final Office Action cited in U.S. Appl. No. 16/897,110, filed Jun. 9, 2020", 12 pages.

"International Search Report and Written Opinion issued in International Patent Application No. PCT/US2021/033355 filed May 20, 2021", mailed Jul. 29, 2021.

"Office Action cited in U.S. Appl. No. 16/897,110, filed Jun. 9, 2020", mailed Aug. 31, 2021, 12 pages.

"Office Action cited in U.S. Appl. No. 16/897,110, filed Jun. 9, 2020", 9 pages.

Desanti, et al., "Transmission of IPV6, IPv4, and Address Resolution Protocol (ARP) Packets over Fibre Channe", RFC 4338.txt, Internet Engineering Task Force, IETF; Standard, Internet Society (ISOC) XP015044776, 33 pages.

Kimmatkar, et al., "Modified Address Resolution Protocol for Delay Improvement in Distributed Environment", Engineering and Systems (SCES), 2013 Students Conference On, IEEE, Apr. 12, 2013, XP032431800, 5 pages.

Plummer, "Network Working Group, An Ethernet Address Resolution Protocol—or—Converting Network Protocol Addresses to 48.bit Ethernet Address for Transmission on Ethernet Hardware", Nov. 1, 1982, XP055108321, Retrieved from the Internet: URL:http://tools.ietf.org/pdf/rfc826.pdf [retrieved on Mar. 17, 2014].

* cited by examiner

DIRECTED BROADCAST IN NETWORK FABRIC

PRIORITY APPLICATION

This application claims the benefit of priority to and is a continuation-in-part of U.S. Application Ser. No. 16/897,110 filed Jun. 9, 2020, entitled "Directed Broadcast In Network Fabric," the entire contents of which are hereby expressly incorporated herein by this reference including, without limitation, the specification, claims, and abstract, as well as any figures, tables or drawings thereof.

TECHNICAL FIELD

This disclosure relates to the use of fabric border nodes and control plane nodes to enable directed broadcasts in fabric network deployments.

BACKGROUND

In conventional network fabric deployments, the network fabric is not configured to allow for directed broadcasts. Directed broadcasts are packets that are sent from one system on a network to all systems on another network. Directed broadcasts assist in implementing remote administrative tasks, such as backup and wake-on-LAN ("WOL") application tasks. In conventional network fabric deployments, the directed broadcasts are dropped at fabric border nodes because the fabric border nodes are not configured for the directed broadcasts. In a conventional virtual local area network ("VLAN"), servers, such as WOL servers, are situated in each VLAN to transmit the directed broadcasts. However, this work-around solution for VLAN cannot be implemented in a network fabric deployment because the solution does not scale.

DETAILED DESCRIPTION

Overview

Figure 1:
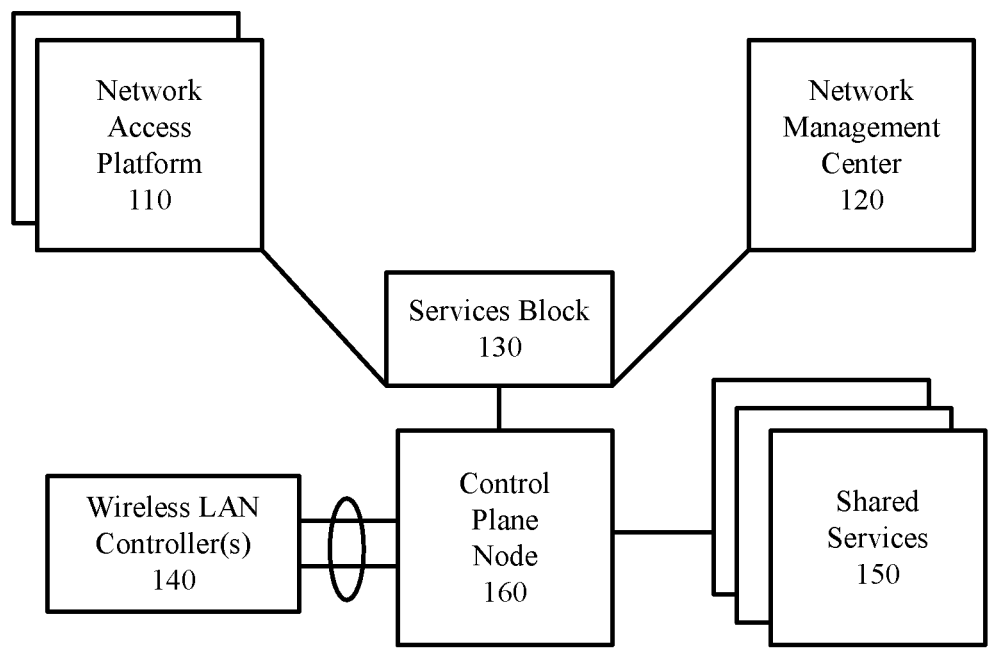
FIG. 1 is a block diagram depicting a computing network system, in accordance with certain examples.

The present technology allows directed broadcasts in network fabrics. A network fabric is a network overlay that is a logical topology that virtually connects devices and is built on top of an arbitrary physical underlay topology. Examples of network overlays include Generic Routing Encapsulation ("GRE") or multipoint Generic Routing Encapsulation ("mGRE"), Multiprotocol Label Switching ("MPLS"), Virtual Private LAN Service ("VPLS"), Internet Protocol Security ("IPSec"), dynamic multipoint virtual private network ("DMVPN"), Control And Provisioning of Wireless Access Points ("CAPWAP"), Location ID Separation Protocol ("LISP"), Overlay Transport Virtual ("OTV"), Dynamic Fabric Automation ("DFA"), and Application Centric Infrastructure ("ACI").

A directed broadcast assists with the implementation of remote administration tasks, such as backups and wake-on-LAN ("WOL") tasks, by sending broadcast packets targeted at the hosts in a specified destination subnet. A packet is the basic unit of information transferred across a network. A packet typically comprises a header with the addresses of the sending and receiving hosts and a body with a data set to be transferred. IP directed broadcast packets have a destination IP address that is a valid broadcast address for the subnet that is the target of the directed broadcast.

To enable a directed broadcast in network fabrics, a control plane node is pre-configured to resolve directed broadcast addresses. The control plane node is configured to map the directed broadcast address to a subnet address associated with the network fabric. The directed broadcast address mapping to the network fabric subnet address is stored in a host trackable database ("HTDB").

A fabric border node receives a directed broadcast from an external network and extracts a destination address associated with the directed broadcast. As the fabric border node is not configured for directed broadcasts, the fabric border node does not recognize the destination address. The fabric border node transmits a request to the control plane node to resolve the destination address.

The control plane node receives the request to resolve the destination address and queries the HTDB for the destination address. The control plane node retrieves the stored mapping and generates a map reply to the fabric border node with a multicast ("mcast") destination including the network fabric subnet address.

The fabric border node receives the mcast destination and encapsulates the directed broadcast with a header including the mcast destination. When data, such as the directed broadcast, moves from an upper layer to a lower layer, each layer may add relevant information, such as a header, along with the actual data. The data package including the header and the data from the upper layer then becomes the data that is repackaged at the next lower layer with the lower layer's header. This packing of data at each layer is encapsulation.

The fabric border node forwards the encapsulated directed broadcast to fabric edge nodes via fabric intermediate nodes. The fabric edge nodes decapsulate the directed broadcast. Decapsulation is the reverse process of encapsulation. The fabric edge nodes unpack the header and use the information in the header to deliver the directed broadcast to appropriate end point devices.

Alternatively, the mapping can be statically programmed on fabric border nodes. In this case, each fabric border node receiving the directed broadcast can resolve the destination address. The fabric border node(s) then obtains the mcast destination address and begins encapsulation. As an example, the fabric border nodes can be statically programmed: Subnet_broadcast_Address->mcast address.

In an alternate embodiment, directed broadcasts can be enabled to devices that are not registered with the mcast destination address for the fabric subnet. A fabric edge node(s) determines if unregistered endpoint devices may be in communication with the fabric edge node(s). The fabric edge node(s) may determine if the fabric edge node(s) has the potential for a silent host to be connected to the fabric edge node(s). A silent host is an end point device that does not announce the end point device presence and and can only be detected by passive means. For-example, a link may be up on a port without a MAC address learned on the port. In addition, a trunk port may be connected to the fabric edge node(s) such that there is a possibility that there might be a silent host may be connected indirectly. The fabric edge node may comprise a port that is up without a MAC address associated with the port, a trunk port with one or more silent hosts, or be connected to a network switch or device that is, in turn, connected to silent hosts. The fabric edge node(s) joins the multicast underlay. By joining the multicast underlay, the fabric edge node(s) is enabled to receive a directed broadcast associated with the resolved destination address and subsequently broadcast the data set associated with the directed broadcast.

In a second alternate embodiment, directed broadcasts can be enabled in network fabric underlays without multicast address support with silent hosts. A fabric edge node(s) determines if silent hosts may be connected to the fabric edge node(s). If the fabric edge node(s) determines that the fabric edge node(s) may be connected to a silent host, the fabric edge node(s) requests the control plane node to map directed broadcasts to the fabric edge node(s) via a unicast transmission. The control plane node stores the mapping in the HTDB. Upon receiving a request to resolve the destination address, the control plane node queries the HTDB for the destination address and retrieves the stored mapping associated with the fabric edge node(s). The control plane node generates a map reply to the fabric border node with a unicast destination(s) associated with the fabric edge node(s). The fabric border node encapsulates the packet and transmits the packet to the fabric edge node(s), which have a silent host connected, as a unicast transmission. The fabric edge node(s) decapsulates the packet and broadcasts the data set.

The present technology allows directed broadcasts in network fabrics. This deployment allows reduced communications of data from external networks to network fabrics as the control plane node (or the fabric border node(s)) is configured to resolve the destination address. Fabric border nodes forward the directed broadcast throughout the network fabric instead of dropping the broadcast. Directed broadcast functions, such as backup and WOL, are thereby enabled without the use of multiple transmissions from external networks to network fabrics, thereby increasing network efficiency.

These and other aspects, objects, features, and advantages of the disclosed technology will become apparent to those having ordinary skill in the art upon consideration of the following detailed description of illustrated examples.

Example System Architecture

Turning now to the drawings, in which like numerals indicate like (but not necessarily identical) elements throughout the figures, examples are described in detail.

FIG. 1 is a block diagram depicting a computing network system 100, in accordance with certain examples. While each server, system, and device shown in the architecture is represented by one instance of the server, system, or device, multiple instances of each can be used. As depicted in FIG. 1, the computing network system 100 comprises a network access platform 110, a network management center 120, a services block 130, a wireless LAN controller(s) 140, a shared services system 150, and a control plane node 160.

The network access platform 110 may comprise one or more computing devices and enables network policy implementation, mapping of users and devices, and security policy enforcement. The network access platform 110 may be in communication with the services block 130 as depicted in FIG. 1 and/or with other components identified in FIG. 1.

The network management center 120 may comprise one or more computing devices and manages configuration and operations workflow areas. For example, the network management center 120 configures device global settings, designs network site profiles for physical device inventory, and manages software, device templates, and user access. The network management center 120 defines business intent for provisioning into a digital network, creates virtual networks, and assigns endpoints to virtual networks. The network management center 120 provisions devices and adds them to inventory, and creates fabric domains, control plane nodes, such as control plane node 160, fabric border nodes, such as fabric border nodes 210, and fabric edge nodes, such as fabric edge nodes 230. The network management center 120 monitors the network using network, client, and application health dashboards. The network management center 120 allows programmatic access to the network and system integration with third-party systems using application programming interfaces ("API"), feature set bundles, configurations, a runtime dashboard, and a developer toolkit. The network management center 120 is in communication with the services block 130 as depicted in FIG. 1 and/or with other components identified in FIG. 1.

The services block 130 functions to allow introduction of new services without requiring a network-wide hot cutover. While FIG. 1 illustrates a single services block 130, the network may comprise multiple services blocks 130 depending on the scale of the network. Example functions that may be included in the services block 130 include centralized Lightweight Access Point Protocol ("LWAPP") wireless controllers, Internet Protocol version 6 ("IPv6") Intra-Site Automatic Tunnel Addressing Protocol ("ISATAP") tunnel termination, local Internet edge, unified communications services, and policy gateways. The services block 130 is in communication with the network access platform 110, the network management center 120, and the control plane node 160 as depicted in FIG. 1 and/or with other components identified in FIG. 1.

The computing network system 100 may include one or more wireless LAN controllers 140. The wireless LAN controller 140 integrates with the control plane node 160. The wireless LAN controller 140 provides access point management, client session management, and mobility services. The wireless LAN controller 140 integrates with the network fabric (illustrated in FIG. 2) to register Media Access Control ("MAC") addresses into a host tracking database ("HTDB") of the control plane node 160 and the supply fabric edge routing locators ("RLOC").

The shared services system 150 is a system that deploys services across multiple virtual networks and may comprise one or more computing devices. The shared services system 150 deploys the shared services such that isolation between different networks is preserved. The shared services include services directed to wireless infrastructure, network management protocols such as Dynamic Host Configuration Protocol ("DHCP"), Domain Name Servers ("DNS"), Internet Protocol ("IP") management, Internet access, IP voice/ video collaboration, and any other services that may be reused in multiple networks. The shared services 150 is in communication with the control plane node 160 as depicted in FIG. 1 and/or with other components identified in FIG. 1.

The control plane node 160 comprises one or more computing devices functioning to track endpoints in a network fabric and to associate the endpoints to fabric nodes. The control plane node 160 enables functions such as the HTDB, map server, and map resolver. The HTDB is a central storage of endpoint identifier ("EID") to fabric edge node bindings. The control plane node 160 receives EID map registrations from edge nodes, such as fabric edge nodes 230. The HTDB supports multiple types of EID lookups keys, such as Internet Protocol Version 4 ("IPv4"), IPv6, or MAC. The map server functions to populate the HTDB. The map resolver responds to map queries from fabric edge devices, such as fabric edge nodes 230. The control plane node 160 functions to decouple the endpoint IP address or MAC address, such as for the EPDs 240, from the endpoint location (closest router).

Each computing network system 100 includes a wired or wireless telecommunication mechanism by which network devices (including devices 110, 120, 130, 140, 150, and 160) can communicate and exchange data. Each computing network system 100 can include, be implemented as, or may be a part of, a wired or wireless communication network, cloud computing environment, or any other appropriate architecture or system that facilitates the communication of signals, data, and/or messages (generally referred to as data). For example, computing network system 100 may include one or more of a LAN, a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, a BLUETOOTH® wireless technology connection, a near field communication ("NFC") connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 2:
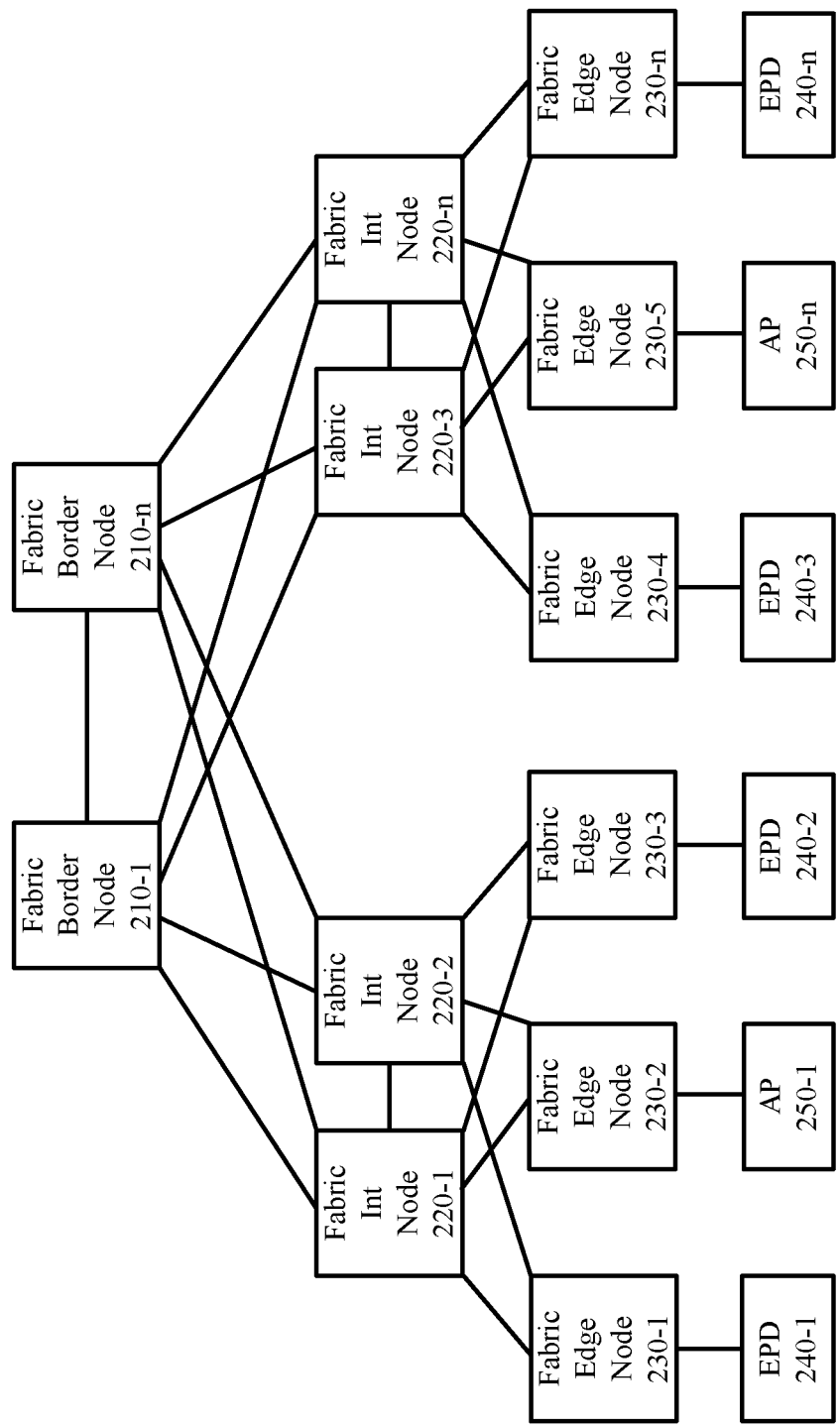
FIG. 2 is a block diagram depicting a network fabric system, in accordance with certain examples.

FIG. 2 is a block diagram depicting a network fabric system, in accordance with certain examples. As depicted in FIG. 2, the network fabric system 200 comprises fabric border nodes 210, fabric intermediate nodes 220, fabric edge nodes 230, end point devices ("EPD") 240, and access points ("AP") 250.

The network fabric system 200 comprises fabric border nodes 210-1 through 210-n. Each fabric border node 210 may comprise one or more computing devices. While FIG. 2 depicts two fabric border nodes 210, the number of fabric border nodes 210 may vary based on the number of EPDs 240 and APs 250 in a particular network fabric, or based on any other suitable factors. For example, a single fabric border node 210 may be sufficient for a network with up to 2,000 EPDs 240, while 2-6 fabric border nodes 210 may be utilized for a larger network with up to 50,000 EPDs 240. The value of 50,000 EPDs 240 is based on current technology and may increase as network technology continues to evolve.

The fabric border nodes 210 serve as a gateway between the network fabric system 200 and external networks, such as the computing network system 100 depicted in FIG. 1. The fabric border nodes 210 function as an entry and exit point for data going into and out of the network fabric system 200. There are three types of fabric border nodes 210: internal, external, and combination internal/external. If the fabric border nodes 210 are configured to be internal to the network fabric system 200, the fabric border nodes 210 are used for known routes with the network fabric system 200 and operate as a gateway for specific network addresses, such as the address for the shared services system 150 or the services block 130, as previously described with respect to FIG. 1. If the fabric border nodes 210 are configured to be external to the network fabric system 200, the fabric border nodes 210 are used for unknown routes external to the network fabric system 200 and operate as a default exit point. The fabric border nodes 210 may also be configured as a combination internal/external node. The combination internal/external fabric border nodes 210 may be used for both known and unknown routes.

The fabric border nodes 210 implement the function of advertisement of EID subnets with traffic destined for EID subnets coming in from outside the network fabric system 200 through the fabric border nodes 210. The fabric border nodes 210 function to extend network virtualization from inside the network fabric system 200 to outside the network fabric system 200 using external virtual routing and forwarding ("VRF") instances with VRF aware routing protocols. The fabric border nodes 210 serve as a fabric domain exit point for fabric edge nodes 230. The fabric border nodes 210 also map security information from within the network fabric system 200, such that the security information is maintained when exiting the network fabric system 200.

The network fabric system 200 comprises fabric intermediate nodes 220-1 through 220-n. Each fabric intermediate node 220 may comprise one or more computing devices. While FIG. 2 depicts four fabric intermediate nodes 220, the number of fabric intermediate nodes 220 may vary based on the number of EPDs 240 and APs 250 in a particular network fabric. For example, a single fabric intermediate node 220 may be sufficient for a virtual network with up to 2,000 EPDs 240, while 1,000 fabric intermediate nodes 220 may be utilized for a larger virtual network with up to 50,000 EPDs 240. The value of 50,000 EPDs 240 is based on current technology and may increase as network technology continues to evolve.

The fabric intermediate nodes 220 may be part of a Layer 3 network used for interconnections between the fabric border nodes 210 and the fabric edge nodes 230. The fabric intermediate nodes 220 are the equivalent of distribution switches and route and transport IP traffic inside the network fabric system 200. The fabric intermediate nodes 220 have a maximum transmission unit ("MTU") requirement to accommodate larger-size IP packets encapsulated with Virtual eXtensible Local Area Network ("VXLAN") information.

The network fabric system 200 comprises fabric edge nodes 230-1 through 230-n. Each fabric edge node 230 may comprise one or more computing devices. While FIG. 2 depicts six fabric edge nodes 230, the number of fabric edge nodes 230 may vary based on the number of EPDs 240 and APs 250 in a particular network fabric, or based on any other suitable factors.

The fabric edge nodes 230 are fabric devices that allow access to or distribution within the network fabric system 200. The fabric edge nodes 230 are responsible for identifying and authenticating fabric endpoints, for example, static, 802.1X, and active directory. The fabric edge nodes 230 are responsible for endpoint registration, for example, /32 or /128, with a control plane node, such as control plane node 160. As EPDs 240 are connected or detected by the fabric edge nodes 230, EID information associated with each EPD 240 is added to an HTDB local to each fabric edge node 230. The EID information may be stored in the local HTDB in an EID-table. Each fabric edge node 230 transmits the data stored in the local HTDB to a control plane node, such as control plane node 160, to populate the HTDB of the control plane node. The fabric edge nodes 230 identify and authenticate the EPDs 240 and the APs 250, and admit, encapsulate/decapsulate, and forward traffic to and from the EPDs 240 and the APs 250 connected to the network fabric system 200 edge.

Traffic between the fabric edge nodes 230 and the fabric border nodes 210 is encapsulated in VXLAN headers or other suitable headers. EPDs 240 may use the same IP address that is within the encapsulation and may move between the different fabric edge nodes 230.

The network fabric system 200 comprises EPDs 240-1 through 240-n. While FIG. 2 depicts four EPDs 240, the number of EPDs 240 may vary based on a particular network fabric 200 configuration with a large deployment, such as a deployment ranging up to 50,000 EPDs 240 or more.

While EPDs 240-1 through 240-n are depicted as similar devices in FIG. 2, each EPD 240 may be one of numerous different types of computing devices. Each EPD 240 may include either a wired or wireless telecommunication mechanism by which the EPD 240 can communicate and exchange data. Each EPD 240 may be a server, personal computer, mobile device (for example, notebook computer, handheld computer, tablet computer, netbook computer, personal digital assistant ("PDA"), video game device, GPS locator device, cellular telephone, Smartphone, or other mobile device), a television with one or more processors embedded therein and/or coupled thereto, Internet-of-things ("IoT") devices, or other appropriate technology that comprises or is coupled to a web browser or other application for communicating via the network fabric system 200.

The network fabric system 200 comprises APs 250-1 through 250-n. While FIG. 2 depicts two APs 250, the number of APs 250 may vary based on a particular network fabric system 200 with a large deployment comprising up to 2,000 APs 250 or more.

While APs 250-1 through 250-n are depicted as similar devices in FIG. 2, each AP 250 may be one of numerous different types of network hardware devices. Each AP 250 may include one or more radios to send and receive wireless radio signals. Each radio may have an internal antenna or both an internal and external antenna. The 802.11 standard designates the radio frequencies used by each AP 250. Each AP 250 may connect to a router (not depicted in FIG. 2) or may be a component of the router itself.

Each AP 250 applies wireless media specific features. For example, each AP 250 applies radio and service set identifier ("SSID") policies, security policies, and peer-to-peer blocking policies. Each AP 250 may convert 802.11 traffic and forward the traffic with VXLAN encapsulation or other suitable encapsulation.

Each network fabric system 200 may comprise one or more subnetworks ("subnet") (not depicted in FIG. 2). A subnet is a segmented piece of a larger network. Devices within each subnet are addressed with an identical most-significant-bit-group in their IP addresses.

Each network fabric system 200 includes a wired or wireless telecommunication mechanism by which system devices (including devices 210, 220, 230, 240, and 250) can communicate and exchange data. Each network fabric system 200 can include, be implemented as, or may be a part of a wired or wireless communication network, cloud computing environment, or any other appropriate architecture or system that facilitates the communication of signals, data, and/or messages (generally referred to as data). For example, network fabric system 200 may include one or more of a LAN, a WAN, an intranet, an Internet, a SAN, a PAN, a MAN, a WLAN, a VPN, a cellular or other mobile communication network, a BLUETOOTH® wireless technology connection, an NFC connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 3:
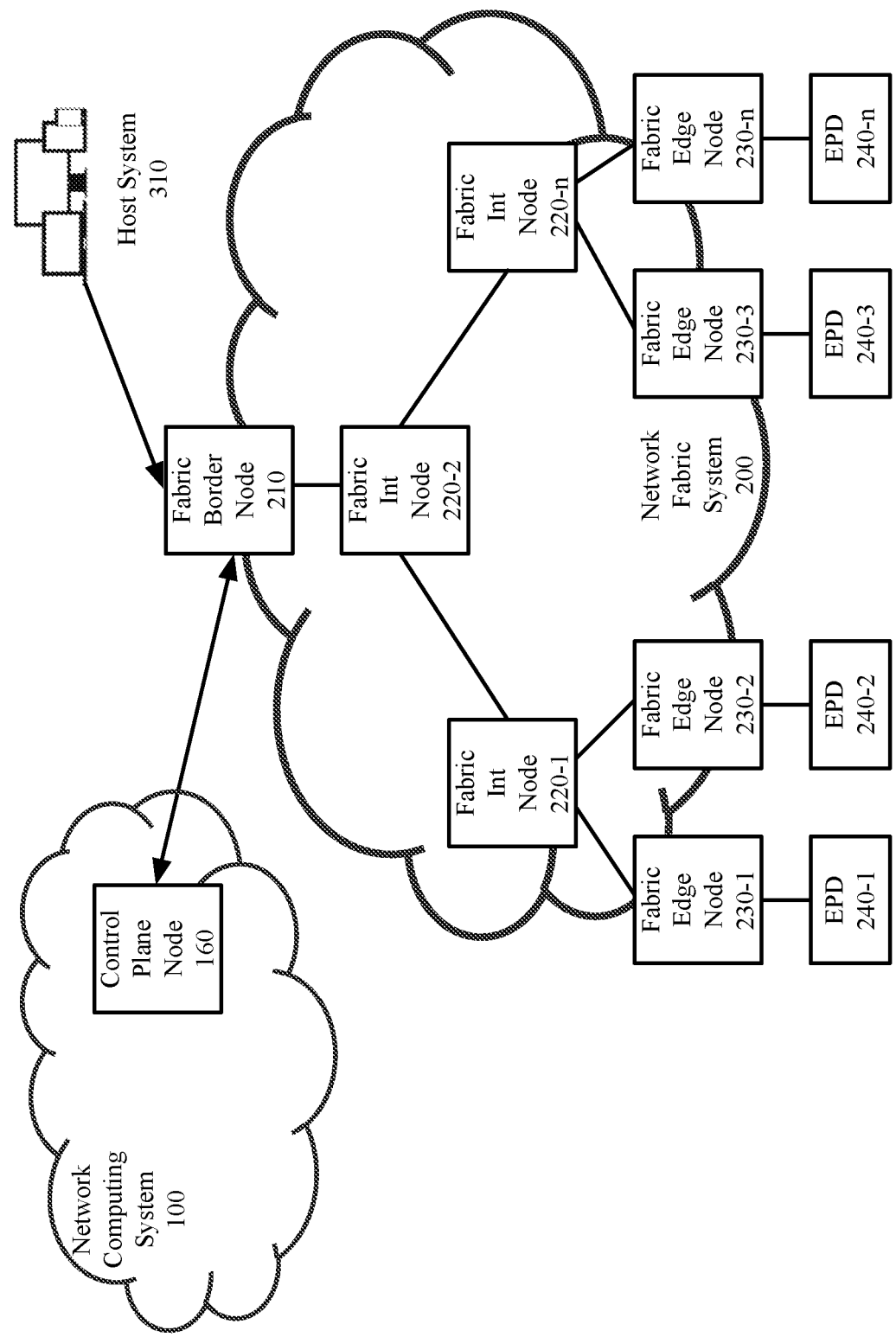
FIG. 3 is a block diagram depicting a directed broadcast system enabling directed broadcasts in network fabrics, in accordance with certain examples.

FIG. 3 is a block diagram depicting a directed broadcast system that enables directed broadcasts in network fabrics, in accordance with certain examples. The directed broadcast system 300 comprises the computing network system 100, the network fabric system 200, and a host system 310. While each of the computing network system 100, the network fabric system 200, and the host system 310 shown in the architecture are represented by one instance of each of the computing network system 100, the network fabric system 200, and the host system 310, multiple instances of each can be used.

Host system 310 may comprise one or more computing devices that are connected to other computing devices via a wired or wireless telecommunication mechanism, such as an Internet connection. Host system 310 is a component of a network system external to computing network system 100 and network fabric system 200. The external network system may be configured similarly to computing network system 100. As illustrated in FIG. 3, host system 310 transmits a directed broadcast to one or more fabric border nodes 210 of network fabric system 200. A directed broadcast is an IP packet whose destination address is for an IP subnet, such as network fabric system 200, that originates from a network or system that is not part of the IP subnet, such as the host system 310. Fabric border node 210 has bidirectional communication established with computing network system 100, more specifically to a control plane node 160 within the computing network system 100. The interactions between the components of the directed broadcast system 300 will be discussed in greater detail with regard to the method of FIG. 4.

Each directed broadcast system 300 includes a wired or wireless telecommunication mechanism by which system devices can communicate and exchange data. Each directed broadcast system 300 can include, be implemented as, or may be a part of a wired or wireless communication network, cloud computing environment, or any other appropriate architecture or system that facilitates the communication of signals, data, and/or messages (generally referred to as data). For example, directed broadcast system 300 may include one or more of a LAN, a WAN, an intranet, an Internet, a SAN, a PAN, a MAN, a WLAN, a VPN, a cellular or other mobile communication network, a BLUETOOTH® wireless technology connection, an NFC connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Figure 8:
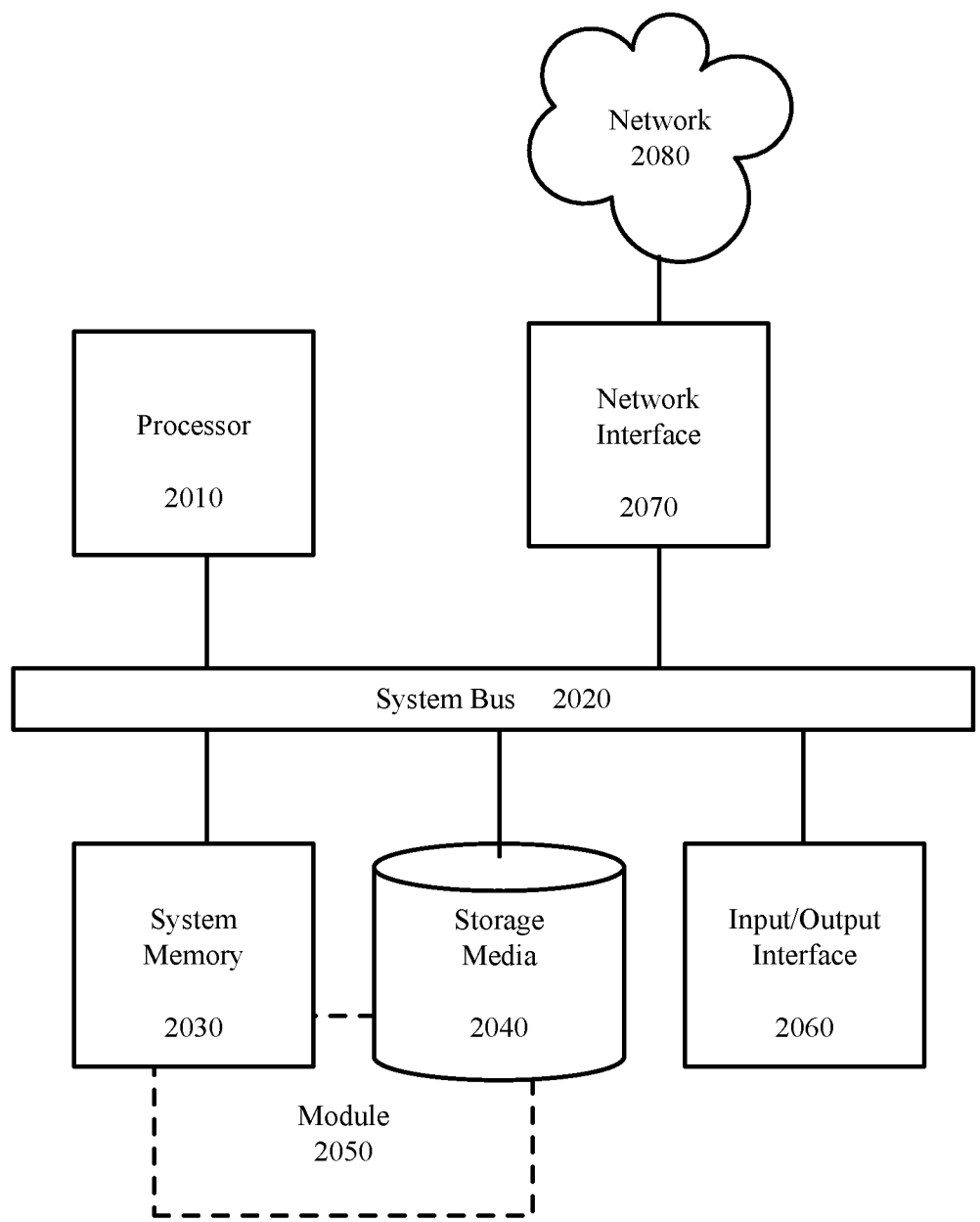
FIG. 8 is a block diagram depicting a computing machine and a module, in accordance with certain examples.

The network computing devices and any other computing machines associated with the technology presented herein may be any type of computing machine, such as, but not limited to, those discussed in more detail with respect to FIG. 8. For example, each device can include a server, a desktop computer, a laptop computer, a tablet computer, a television with one or more processors embedded therein and/or coupled thereto, a smart phone, a handheld computer, a PDA, a router, a switch, a hub, a gateway, a modem, an access point, a bridge, or any other wired or wireless processor-driven device. The computing machines discussed herein may communicate with one another, as well as with other computing machines or communication systems over one or more networks.

Furthermore, any modules associated with any of these computing machines, such as modules described herein, or any other modules (scripts, web content, software, firmware, or hardware) associated with the technology presented herein may be any of the modules discussed in more detail with respect to FIG. 8.

The network connections illustrated are examples and other means of establishing a communications link between the computers and devices can be used. Moreover, those having ordinary skill in the art having the benefit of the present disclosure will appreciate that the devices illustrated in FIGS. 1-3 may have any of several other suitable computer system configurations.

Example Processes

The methods illustrated in FIGS. 4 through 7 are described hereinafter with respect to the components of the computing network system 100, the network fabric system 200, and the directed broadcast system 300. The methods of FIGS. 4 through 7 may also be performed with other systems and in other environments. The operations described with respect to FIGS. 4 through 7 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 4:
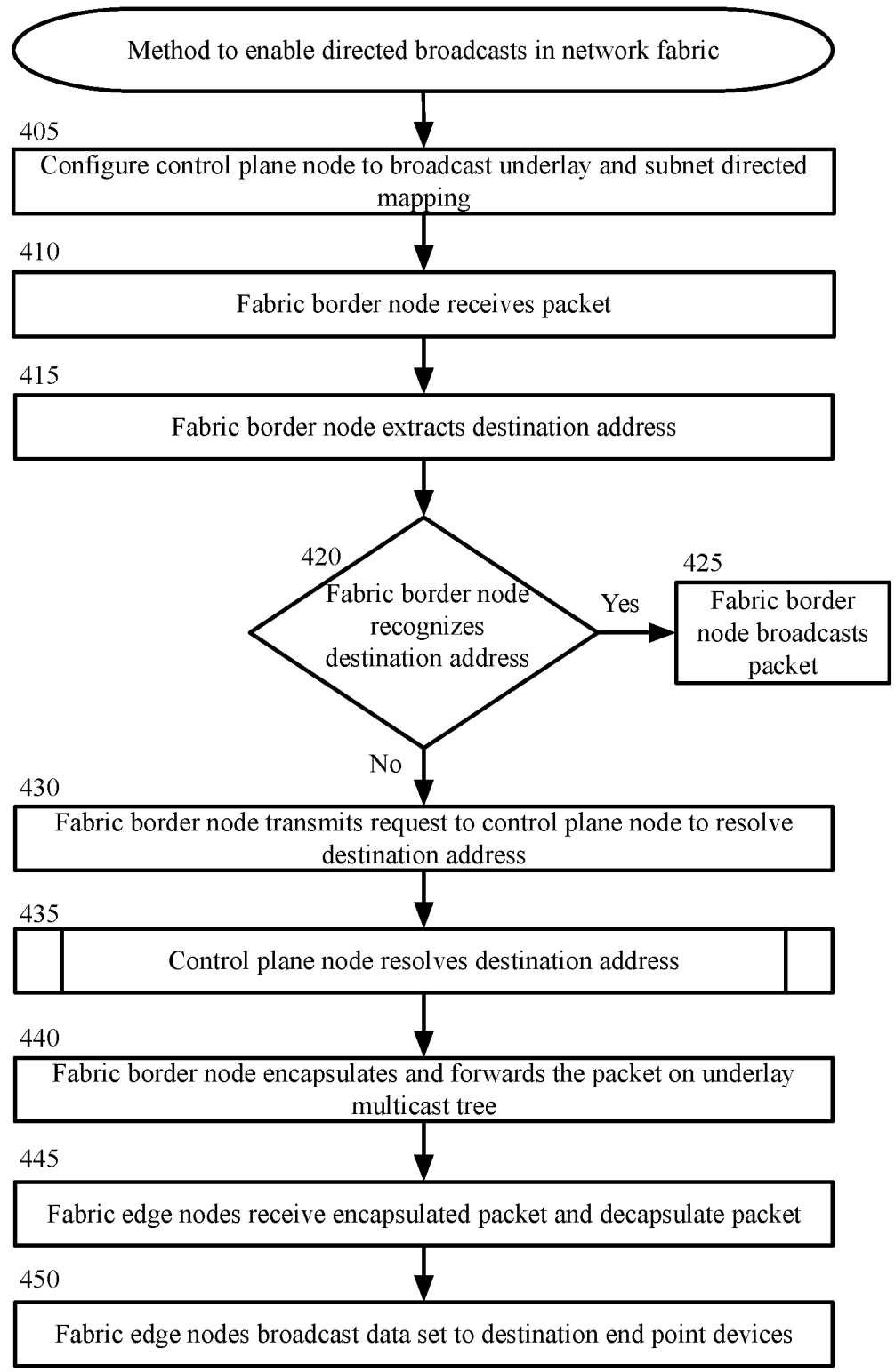
FIG. 4 is a block flow diagram depicting a method to enable directed broadcasts in network fabrics, in accordance with certain examples.

FIG. 4 is a block flow diagram depicting a method 400 to enable directed broadcasts in network fabrics, in accordance with certain examples.

In block 405, the control plane node 160 is configured to broadcast underlay and fabric subnet directed mapping. For example, the control plane node 160 is configured to use a multicast ("mcast") group to resolve a fabric subnet directed broadcast. Any suitable method may be used to resolve the fabric subnet directed broadcast. The control plane node 160 may be remotely configured programmatically through the computing network system 100. The control plane node 160 may also be configured via an administrative user of the control plane node 160. The fabric subnet directed broadcast address is registered with an endpoint identifier ("EID") of a destination routing locator ("RLOC") of an underlay mcast group. In an example, the destination RLOC may be an Internet Protocol Version 4 ("IPv4") or Internet Protocol Version 6 ("IPv6") address of an egress tunnel router ("ETR"). The destination RLOC is an output of an EID-to-RLOC mapping lookup.

In an example, the fabric subnet directed broadcast address is 10.1.1.255. The control plane node 160 is configured using the "broadcast-underlay" command. The fabric subnet directed broadcast destination address is mapped to an mcast address of the fabric subnet RLOC. Continuing with the example, the control plane node 160 is configured as follows: broadcast-underlay 239.0.0.1 and corresponding subnet-directed mapping; database-mapping 10.1.1.255/32 (network prefix followed by bit allocation) 239.0.0.1 priority 1 weight 100. In the example, the mapping 10.1.1.255 to 239.0.0.1 is stored in the host tracking data base ("HTDB") of the control plane node 160. In an alternate example, the mapping may be stored in a HTDB associated with one or more fabric edge nodes 230.

In block 410, the fabric border node 210 receives a packet. In an example, the packet is a fabric subnet directed broadcast. The host system 310, or any other external system, transmits a fabric subnet directed broadcast to the subnet address of one or more fabric border nodes 210 of network fabric system 200. The directed broadcast is a packet comprising a header and a body with a data set to be transmitted to a destination address. The destination address is an IP address that is a valid broadcast address for the fabric subnet that is the target of the directed broadcast. The header includes an address block directed to the fabric border node 210. The address block includes a network prefix and a bit allocation for the network prefix. In an example, the subnet is a virtual network ("VN") with an address block 10.1.1.0/24. The "10.1.1.0" component of the address block is the network prefix and the "/24" component of the address block is the number of bits allocated for the network prefix.

In block 415, the fabric border node 210 extracts a destination address associated with the packet. Continuing with the example that the packet is a directed broadcast, directed broadcast addresses are special values in the host-identification part of an IP address. To extract the destination address, the fabric border node 210 compares the subnet address to the subnet mask to construct a destination address. The subnet address is the network prefix component of the address block. The subnet mask is a 32-bit number that masks an IP address and divides the IP address into a network address and a host address, the host address being the destination address for the directed broadcast. The fabric border node 210 constructs the subnet mask utilizing the number of allocated bits from the address block. In the continuing example with the address block of 10.1.1.0/24, the number after the slash, in this example "24," represents the number of consecutive 1's in binary notation in the subnet mask, which would be represented by 255.255.255.0 in decimal notation.

The fabric border node 210 compares the network IP address to the subnet mask to determine the destination address. In the continuing example, the fabric border node 210 compares the network IP address 10.1.1.0 to the subnet mask 255.255.255.0 octet by octet, as illustrated in Table 1.

TABLE 1

| Network IP Address | 10.1.1.0 |
|---|---|
| Subnet Mask | 255.255.255.0 |
| Destination Address | 10.1.1.255 |

In the comparison, if the value of the subnet mask octet is non-zero, the fabric border node 210 retains the value of the network IP address octet. If the value of the subnet mask octet is zero, the fabric border node 210 replaces the value of the network IP address with the decimal notation of the bit allocation. In the continuing example illustrated in Table 1, in the first octet, the "10" of the network IP address is compared to the "255" of the subnet mask. The "10" is retained as the first octet of the destination address as the value of the subnet mask octet is non-zero. The comparisons continue octet by octet with the "1" being retained in the second octet, the "1" being retained in the third octet, and the "0" being replaced by "255" in the fourth octet. The fabric border node extracts 10.1.1.255 as the destination address. The fabric border node 210 proceeds to query internal memory for the destination address.

In block 420, the fabric border node 210 determines whether the destination address is recognized based upon the query in block 415. If the EID associated with each of the end point devices ("EPD") 240 is not configured for directed broadcast, the fabric border node 210 will not recognize the destination address. If the destination address is not recognized, the method 400 proceeds to block 430.

In block 430, the fabric border node 210 transmits a request to the control plane node 160 to resolve the destination address. In the continuing example, the fabric border node 210 transmits a request to the control plane node 160 to resolve the destination address 10.1.1.255.

In block 435, the control plane node 160 resolves the destination address. Block 435 is described in greater detail herein with reference to the method 435 of FIG. 5.

Figure 5:
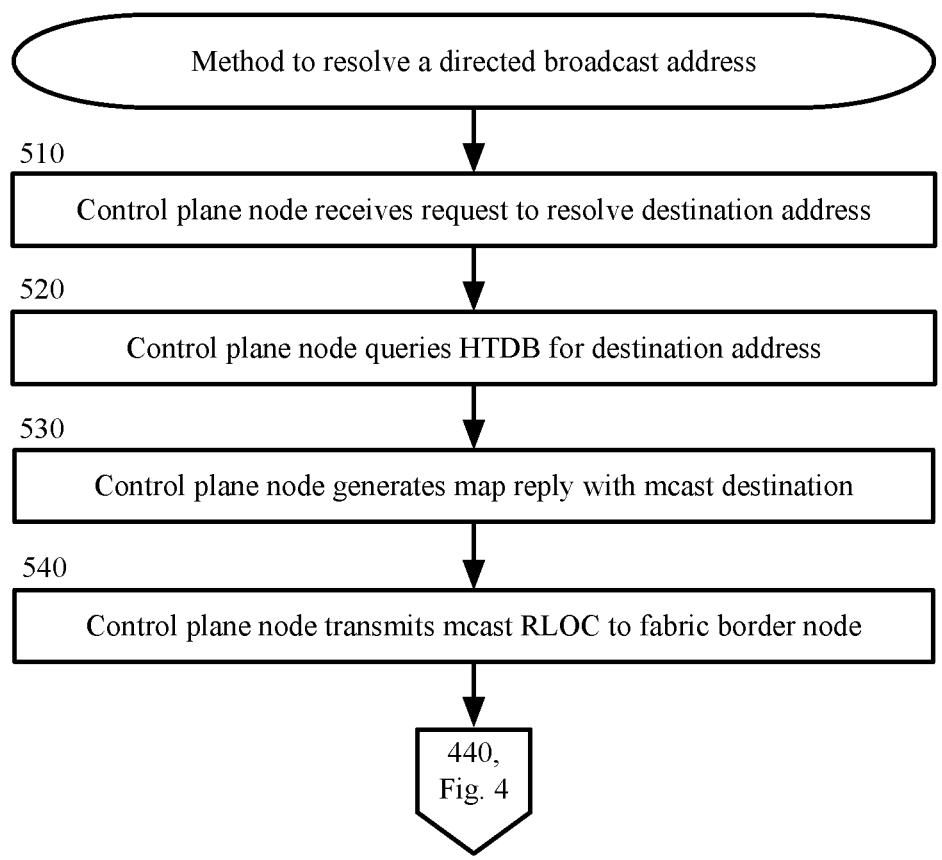
FIG. 5 is a block flow diagram depicting a method to resolve a directed broadcast address, in accordance with certain examples.

FIG. 5 is a block flow diagram depicting a method 435 to resolve a destination address, in accordance with certain examples.

In block 510, the control plane node 160 receives a request to resolve a destination address from a fabric border node 210. In the continuing example, the destination address is 10.1.1.255. The request from the fabric border node 210 triggers a mapping service within the control plane node 160.

In block 520, the control plane node 160 queries the HTDB for the destination address. The map resolver function of the control plane node 160 queries the HTDB of the control plane node 160 for the destination address. In the continuing example, the destination address 10.1.1.255 was mapped to the fabric subnet address 239.0.0.1 in block 405 of FIG. 4. The map resolver function of the control plane node 160 retrieves the mapping from the HTDB.

In block 530, the control plane node 160 generates a map reply with an mcast destination. The map reply includes an mcast RLOC mapping. In the continuing example, the mcast destination is the fabric subnet address 239.0.0.1.

In block 540, the control plane node 160 transmits the mcast RLOC mapping to the fabric border node 210. The mcast RLOC enables the fabric border node 210 to send the directed broadcast using an mcast group address. The mcast group address includes each EID registered within the fabric subnet 239.0.0.1. As discussed previously, other suitable group addresses may be used in place of the mcast group address.

From block 540, the method 435 returns to block 440 of FIG. 4.

In block 440, the fabric border node 210 receives the mcast RLOC mapping from the control plane node 160, encapsulates the packet, and forwards the encapsulated packet on the underlay multicast tree. The fabric border node 210 receives the mcast RLOC from the control plane node 160. The fabric border node 210 encapsulates the packet in VXLAN or other suitable format with the destination RLOC as the mcast address, such as 239.0.0.1 from the continuing example, and forwards the encapsulated packet on the underlay mcast tree. The encapsulated packet follows normal mcast replication and reaches the intended receivers, such as the fabric edge nodes 230.

In block 445, the fabric edge nodes 230 receive the encapsulated packet and decapsulate the packet. The fabric edge nodes 230 decapsulate the packet by unpacking the packet header and use the information in the header to determine the end point devices 240 that should receive the packet.

In block 450, the fabric edge nodes 230 broadcast the data set from the packet to the destination end point devices 240. The fabric edge nodes 230 translate the packet into a broadcast that distributes the data set from the packet to the end point devices 240 targeted to receive the packet. The packet, in the continuing example a directed broadcast, has subsequently reached the intended receivers end point devices 240.

In an alternate embodiment, the fabric border nodes 210 may be configured to resolve the destination address. The fabric border nodes 210 may be configured to broadcast underlay and fabric subnet directed mapping. The fabric border nodes 210 may be configured to use a multicast ("mcast") group to resolve a fabric subnet directed broadcast associated with the destination address. The fabric border nodes 210 may be remotely configured programmatically through the computing network system 100. The fabric border nodes 210 may also be configured via an administrative user of the fabric border nodes 210. The fabric subnet directed broadcast address is registered with an endpoint identifier ("EID") of a destination routing locator ("RLOC") of an underlay mcast group. The destination RLOC may be an Internet Protocol Version 4 ("IPv4") or Internet Protocol Version 6 ("IPv6") address of an egress tunnel router ("ETR"). The destination RLOC is an output of an EID-to-RLOC mapping lookup.

In an example of the alternate embodiment, the fabric subnet directed broadcast address is 10.1.1.255. The fabric subnet directed broadcast destination address is mapped to an mcast address of the fabric subnet RLOC. Continuing with the example, the fabric border nodes 210 are configured as follows: broadcast-underlay 239.0.0.1 and corresponding subnet-directed mapping; database-mapping 10.1.1.255/32 (network prefix followed by bit allocation) 239.0.0.1 priority 1 weight 100. In the example, the mapping 10.1.1.255 to 239.0.0.1 is stored in an internal data base of each of the fabric border nodes 210. Referring back to block 420, in the alternate embodiment if the fabric border node 210 does not recognize the destination address, the fabric border node 210 queries the internal data base for the destination address and retrieves the mapping with the mcast destination. In the alternate embodiment, the method omits blocks 430 and 435 and proceeds to block 440 as previously described.

Referring back to block 420, if the destination address is recognized, the method 400 proceeds to block 425 where the fabric border node 210 forwards the packet to the destination address. The packet is forwarded from the fabric border node 210 to the fabric edge nodes 230 via the fabric intermediate nodes 220. The fabric edge nodes 230 translate the packet into a broadcast that distributes the packet to the end point devices 240 targeted to receive the packet.

Figure 6:
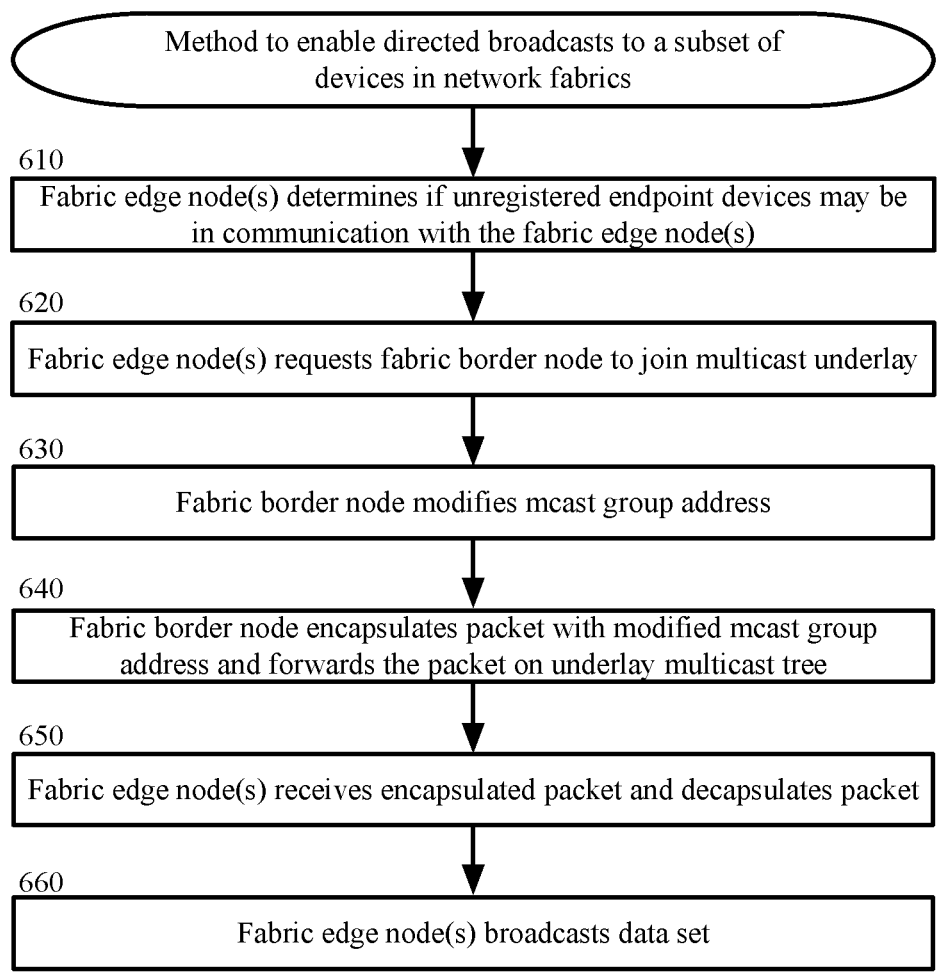
FIG. 6 is a block flow diagram depicting a method to enable directed broadcasts to a subset of network devices in network fabrics, in accordance with certain examples.

FIG. 6 presents an embodiment to enable directed broadcasts to devices that are not registered with the multicast destination address for the fabric subnet 239.0.0.1. FIG. 6 is a block flow diagram depicting a method 600 to enable directed broadcasts to a subset of network devices in network fabrics, in accordance with certain examples. While the examples of FIG. 6 are described with reference to a single fabric edge node 230, one or more fabric edge nodes 230 may implement the method 600.

In block 610, fabric edge node 230 determines if unregistered endpoint devices, such as end point devices 240, may be in communication with fabric edge node 230. In an example, fabric edge node 230 may determine if fabric edge node 230 has the potential for a silent host to be connected to fabric edge node 230. A silent host is an end point device that does not announce the end point device presence and therefore would not be registered with the multicast destination address for the fabric subnet 239.0.0.1. Fabric edge node 230 may comprise a port that is up without a MAC address associated with the port. Fabric edge node 230 may comprise a trunk port with one or more silent hosts. Fabric edge node 230 may be connected to a network switch or device that is, in turn, connected to multiple hosts (silent hosts) not registered with the multicast destination address for the fabric subnet 239.0.0.1. If a fabric edge node 230 determines that the fabric edge node 230 may be connected to a device that is not registered with the multicast destination address for the fabric subnet 239.0.0.1, the method proceeds to block 620.

In block 620, fabric edge node 230 requests fabric border node 210 to join the multicast underlay. By joining the multicast underlay, fabric edge node 230 is enabled to receive a directed broadcast associated with a resolved destination address, as previously described herein with reference to FIGS. 4 and 5.

In block 630, fabric border node 210 modifies the mcast group address received as the resolved address from the control plane node 160. Requesting a resolved address from the control plane node 160 and receiving the resolved address from the control plane node 160 were previously described herein with reference to FIG. 4 and FIG. 5. In an example, fabric border node 210 modifies the resolved address to include an address associated with fabric edge node 230.

In block 640, fabric border node 210 encapsulates the packet with the modified mcast group address and forwards the packet on the underlay multicast tree. The fabric border node 210 encapsulates the packet in VXLAN or other suitable format with the destination RLOC as the modified mcast address, such as 239.0.0.1 from the continuing example, and forwards the encapsulated packet on the underlay mcast tree. The encapsulated packet follows normal mcast replication and reaches the intended receivers, such as fabric edge node 230.

In block 650, fabric edge node 230 receives the encapsulated packet and decapsulates the packet. Block 650 was previously described herein with reference to block 445 of FIG. 4.

In block 660, fabric edge node 230 broadcasts the data set. Fabric edge node 230 translates the packet into a broadcast that distributes the data set from the packet. The packet may be communicated via a port that is up, a trunk port, or a network switch as described previously herein with reference to block 610. The packet, in the continuing example a directed broadcast, has subsequently reached a subset of devices not registered with the multicast destination address for the fabric subnet 239.0.0.1.

Figure 7:
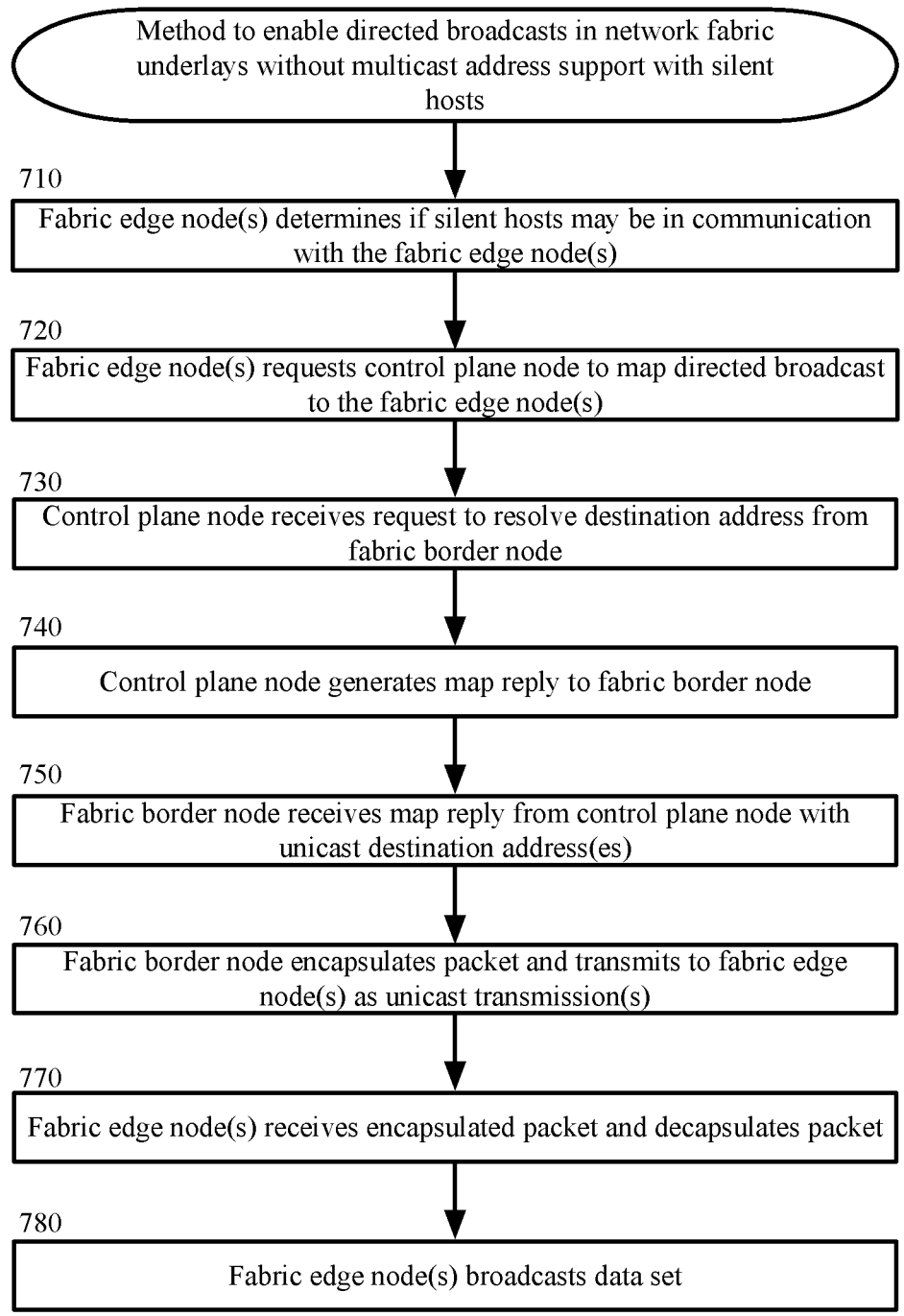
FIG. 7 is a block flow diagram depicting a method to enable directed broadcasts in network fabric underlays without multicast address support with silent hosts, in accordance with certain examples.

FIG. 7 presents an embodiment to enable directed broadcasts via unicast address transmissions in network fabric underlays without multicast address support with silent hosts. FIG. 7 is a block flow diagram depicting a method 700 to enable directed broadcasts in network fabric underlays without multicast address support with silent hosts, in accordance with certain examples. While the examples of FIG. 7 are described in reference to a single fabric edge node 230, one or more fabric edge nodes 230 may implement the method 700.

In block 710, fabric edge node 230 determines if silent hosts may be in communication with fabric edge node 230. A silent host is an end point device that does not announce the end point device presence. Fabric edge node 230 may comprise a port that is up without a MAC address associated with the port. Fabric edge node 230 may comprise a trunk port with one or more silent hosts. Fabric edge node 230 may be connected to a network switch or device that is, in turn, connected to multiple hosts, or silent hosts. If a fabric edge node 230 determines that the fabric edge node 230 may be connected to a silent host, the method proceeds to block 720.

In block 720, fabric edge node 230 requests control plane node 160 to map directed broadcasts to fabric edge node 230. In an example, fabric edge node 230 requests control plane node 160 to map a directed broadcast with a destination address of 10.1.1.255 to an address associated with fabric edge node 230. In an example, the address associated with fabric edge node 230 is an IP address, MAC address, or any other suitable address or identifier of fabric edge node 230. In an example, control plane node 160 stores a mapping of destination address 10.1.1.255 to the address associated with fabric edge node 230. In an example, the mapping of 10.1.1.255 to the address associated with fabric edge node 230 is stored in the host tracking data base ("HTDB") of the control plane node 160.

In block 730, control plane node 160 receives a request to resolve a destination address from fabric border node 210. As previously discussed herein with reference to FIG. 5, the control plane node 160 receives a request to resolve a destination address from a fabric border node 210. The destination address is 10.1.1.255.

In block 740, control plane node 160 generates a map reply to fabric border node 210. In an example, the request from the fabric border node 210 triggers a mapping service within the control plane node 160. The map resolver function of the control plane node 160 queries the HTDB of the control plane node 160 for the destination address. In the continuing example, the destination address 10.1.1.255 was mapped to the address associated with fabric edge node 230 in block 720. The map resolver function of the control plane node 160 retrieves the mapping from the HTDB. Control plane node 160 transmits the map reply to the fabric border node 210. The map reply is a unicast destination address associated with fabric edge node 230.

In block 750, fabric border node 210 receives the map reply from control plane node 160 with the unicast destination address(es).

In block 760, fabric border node 210 encapsulates the packet and transmits the encapsulated packet to fabric edge node(s) 230 as a unicast transmission with the unicast destination address(es) of fabric edge node(s) 230.

In block 770, fabric edge node 230 receives the encapsulated packet and decapsulates the packet. Block 770 was previously described herein with reference to block 445 of FIG. 4.

In block 780, fabric edge node 230 broadcasts the data set. Fabric edge node 230 translates the packet into a broadcast that distributes the data set from the packet. The packet may be communicated via a port that is up, a trunk port, or a network switch as described previously herein with reference to block 710. The packet, in the continuing example a directed broadcast, has subsequently reached silent hosts in communication with fabric edge node 230.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. The processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include WANs, LANs, intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. Any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. Computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The systems, methods, and acts described in the examples presented previously are illustrative, and, alternatively, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A method, comprising:
   by one or more computing devices:
   receiving, at a fabric border node and from an external computing system, a packet comprising a header and a data set, wherein the packet is a directed broadcast;
   extracting, at the fabric border node, a destination address from the packet;
   determining that the fabric border node does not recognize the destination address;
   based at least in part on the fabric border node not recognizing the destination address, transmitting, from the fabric border node and to a mapping computing device, a request to resolve the destination address;
   receiving, at the fabric border node and from the mapping computing device, resolved address that maps to the destination address;
   receiving, at the fabric border node and from one or more distribution computing devices, a request to receive transmissions associated with the packet;
   modifying the resolved address based on the request to receive transmissions associated with the packet to result in a modified resolved address;
   encapsulating the packet with the modified resolved address; and
   transmitting the encapsulated packet to the one or more distribution computing devices having the modified resolved address.

2. The method of claim 1, wherein the modified resolved address corresponds to the one or more distribution computing devices.

3. The method of claim 2, wherein the extracted address is an Internet Protocol (IP) address.

4. The method of claim 1, wherein the resolved address comprises a multicast destination address.

5. The method of claim 4, wherein modifying the resolved address comprises adding an address associated with each of the one or more distribution computing devices requesting to receive transmissions associated with the packet to the multicast destination address.

6. The method of claim 1, wherein the mapping computing device is a control plane node.

7. The method of claim 1, wherein resolving the address comprises:
by the mapping computing device:
receiving the request to resolve the address;
retrieving a mapping associated with the address;
generating a map reply with a destination address; and
transmitting the resolved address to the one or more computing devices, the resolved address comprising the map reply with the destination address.

8. The method of claim 7, wherein the destination address comprises a multicast destination address.

9. The method of claim 7, further comprising:
configuring, by a computing network system, the mapping computing system to map the address to the destination address; and
storing, by the mapping computing system, the mapping.

10. The method of claim 1, wherein the one or more computing devices are border nodes in a network fabric.

11. The method of claim 1, wherein the request to receive transmissions associated with the packet is based on a determination, by each of the one or more distribution computing devices, that a particular distribution computing device comprises at least one of an open port without an associated MAC address, a trunk port, and a network switch, such that the particular distribution computing device may be in communication with a silent host.

12. The method of claim 11, comprising:
by the one or more distribution computing devices:
receiving the encapsulated packet with the resolved address;
decapsulating the packet; and
broadcasting the data set via at least one of the open port, the trunk port, and the network switch.

13. The method of claim 1, comprising:
determining that the one or more computing devices cannot resolve the address prior to transmitting the request to resolve the address to the mapping computing device.

14. A system, comprising:
a storage device; and
a processor communicatively coupled to the storage device, wherein the processor executes application code instructions that are stored in the storage device to cause the system to:
receive, at a fabric border node and from an external computing system, a packet comprising a header and a data set, wherein the packet is a directed broadcast;
extract, at the fabric border node, a destination address from the packet;
determine that the fabric border node does not recognize the destination address;
based at least in part on the fabric border node not recognizing the destination address, transmit, from the fabric border node and to a mapping computing device, a request to resolve the destination address;
receive, at the fabric border node and from the mapping computing device, resolved address that maps to the destination address;
receive, at the fabric border node and from one or more distribution computing devices, a request to receive transmissions associated with the packet;
modify the resolved address based on the request to receive transmissions associated with the packet to result in a modified resolved address;
encapsulate the packet with the modified resolved address; and
transmit the encapsulated packet to the one or more distribution computing devices having the modified resolved address.

15. The system of claim 14, wherein the modified resolved address corresponds to the one or more distribution computing devices.

16. The system of claim 15, wherein the extracted address is an Internet Protocol (IP) address.

17. The system of claim 14, wherein the resolved address comprises a multicast destination address.

18. The system of claim 17, wherein modifying the resolved address comprises adding an address associated with each of the one or more distribution computing devices requesting to receive transmissions associated with the packet to the multicast destination address.

19. A computer program product, comprising:
a non-transitory computer-readable medium having computer-readable program instructions embodied thereon that, when executed by a computer, cause the computer to:
receive, at a fabric border node and from an external computing system, a packet comprising a header and a data set, wherein the packet is a directed broadcast;
extract, at the fabric border node, a destination address from the packet;
determine that the fabric border node does not recognize the destination address;
based at least in part on the fabric border node not recognizing the destination address, transmit, from the fabric border node and to a mapping computing device, a request to resolve the destination address;
receive, at the fabric border node and from the mapping computing device, resolved address that maps to the destination address;
receive, at the fabric border node and from one or more distribution computing devices, a request to receive transmissions associated with the packet;
modify the resolved address based on the request to receive transmissions associated with the packet to result in a modified resolved address;
encapsulate the packet with the modified resolved address; and
transmit the encapsulated packet to the one or more distribution computing devices having the modified resolved address.

20. The computer program product of claim 19, wherein modified resolved address corresponds to the one or more distribution computing devices.

* * * * *